April 12, 1938.        H. KOREMATSU        2,113,919
VEHICLE SIGNAL DEVICE
Filed Nov. 24, 1936
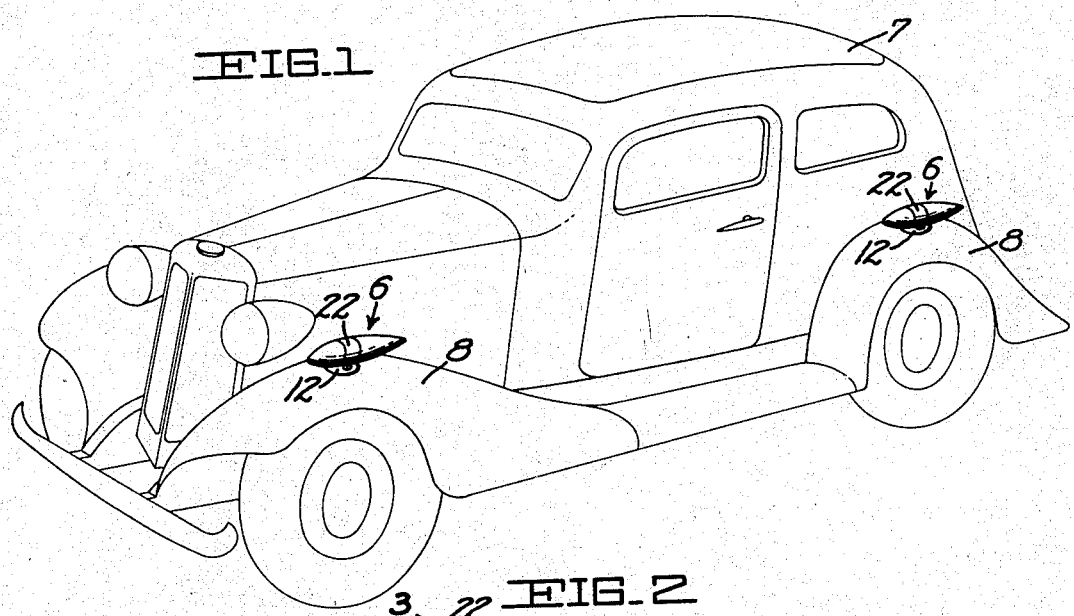
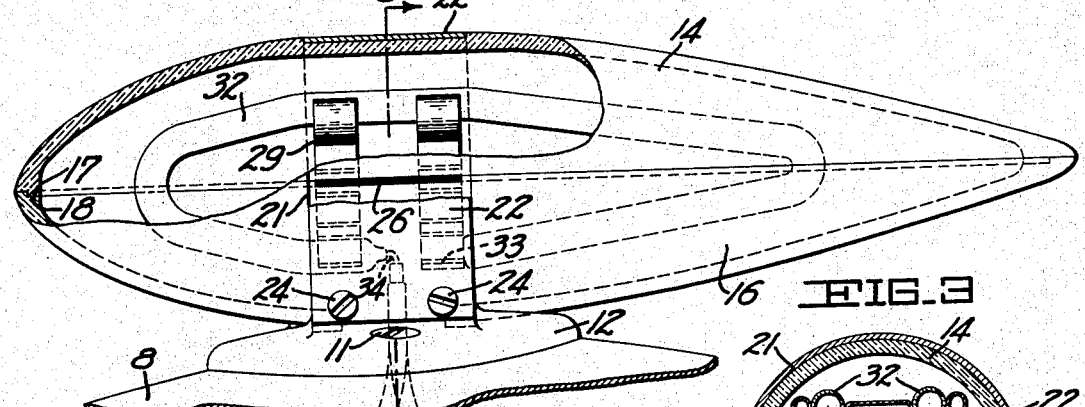
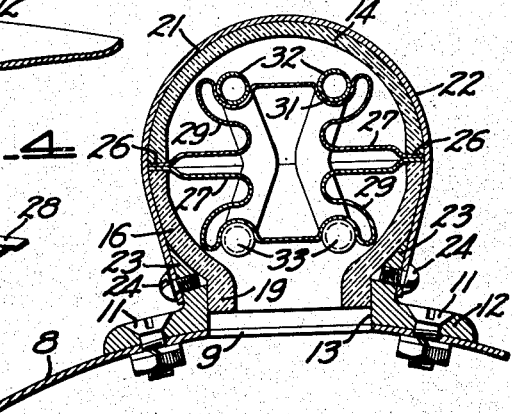
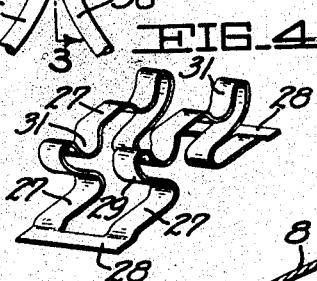
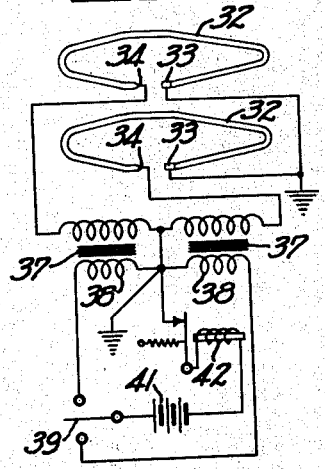
INVENTOR
Hi Korematsu
BY Harry C. Schweder
ATTORNEY Patented Apr. 12, 1938

2,113,919

UNITED STATES PATENT OFFICE 2,113,919

VEHICLE SIGNAL DEVICE

Hi Korematsu, Oakland, Calif., assignor of one-third to J. S. Killam, Piedmont, Calif., and one-third to Harry C. Schroeder, Concord, Calif.

Application November 24, 1936, Serial No. 112,540

4 Claims. (Cl. 177—320)

This invention relates to visual signal devices used to indicate the directions of movement of a vehicle.

It is an object of the invention to provide an improved construction for vehicle signal devices.

Another object of the invention is to provide novel means for supporting the signal lamps in a device of the character described.

A further object of the invention is to provide improved means for resiliently supporting the signal lamps and for conducting the current in the lamp circuits.

The invention possesses other objects and features of importance, some of which, together with the foregoing, will be specifically set forth in the detailed description of the invention hereunto annexed. It is to be understood that the invention is not to be limited to the particular species thereof shown and described as various other embodiments thereof may be employed within the scope of the appended claims.

Referring to the drawing:

Figure 1 is a perspective view of an automobile showing the application of the signal devices of my invention thereto.

Figure 2 is a side elevational view of the signal device, portions of the view being broken away so as to more clearly disclose the interior construction.

Figure 3 is a vertical sectional view of the signal device. The plane of section is indicated by the line 3—3 of Figure 2.

Figure 4 is a perspective view of one of the lamp mounting clips.

Figure 5 is a wiring diagram showing the electrical circuits for energizing the signal lamps.

In detail, a plurality of the signal devices, generally indicated in Figure 1 by the reference numeral 6, may be placed on the automobile 7 in pairs at each side thereof so that at least two of the signals will be visible to an observer regardless of from what angle the vehicle is viewed. The signals may be mounted on any portion of the vehicle, where they may be clearly seen, preferably on the fenders 8.

Each of the fenders 8, or other surface of the vehicle body upon which the signals are mounted, is provided with an aperture 9 through which the electric wiring may be passed and overlying the aperture, and secured to the fender by means of screws 11, is a base 12 having an aperture 13 therein which registers with the fender aperture 9. Disposed on the base 12 is a streamlined, hollow, signal lamp casing comprising an upper section 14 and a lower section 16. The upper section is provided along its edge with a ridge 17 which engages in a complementary recess 18 formed on the edge of the lower section so that when the two sections are joined relative horizontal movement therebetween is prevented. The lower section is provided with a centrally apertured boss 19 which enters the aperture 13 of the base 12, and the upper section and part of the lower section are provided with a peripheral groove 21 in which is seated a strap 22 whose opposite ends are secured to lugs 23, rising upwardly from the base 12, by screws 24. The lamp casing, by the structure just described, is securely attached to the base 12. The casing is made of transparent material which may be glass, a phenol-resin composition, molded celluloid, or any substance of a like nature.

Means are provided for supporting light sources within the lamp casing. Formed in each edge of the upper and lower casing sections 14 and 16 between the edges of the groove 21 is a notch which, when the sections are clamped together by the strap 22, provide a pair of opposed apertures 26. A pair of lamp supports is provided each constructed of a single portion of thin sheet metal having its center section removed to form a rectangular frame having narrow sides 27 and ends 28 joining the sides together. Each side 27 is provided with a pair of upwardly directed S-shaped bends 29 and with half-round depressions 31. Each of the depressions provides a cradle for a portion of a pair of C-shaped electric discharge tubes 32 which are, as is best shown in Figure 3, disposed side by side in the lamp casing. One end of each tube is provided with a metallic terminal cap 33 which, lying in one of the depressions 31 forms electrical contact therewith and the other end of the tube is provided with a terminal 34 to which the current conductors 36 are secured. The glass of the tube insulates the latter terminal from the metallic lamp support. The ends 28 of the lamp supports are seated in the casing apertures 26 and there is sufficient spring in the metal of the supports so that the ends are urged into contact with the strap 22 which encircles the lamp casing and the depressed portions 31 of the support are urged outwardly so as to firmly engage the peripheries of the tubes 32. The tubes 32, when energized, display differently colored lights for instance, one of the tubes may be made of white glass and filled with neon gas so that it will emit a red light and the other tube may be made of yellow or amber glass and filled with mercury vapor so that it will emit a green light.

Due to the provision of the S-shaped bends 29 in the lamp supports the lamps are free to move, within limits, in any direction within the lamp casing. This will be understood upon reference to Figures 3 and 4 of the drawing wherein it will be seen that movement of the lamps vertically or transversely of the longitudinal axis of the casing is permitted due to flexing of the bends 29, while movement of the lamps parallel to the axis of the casing is permitted due to the ability of the portions of the supports between each of the lamp engaging depressions 31 and the fixed sides 29 to twist as the relative positions of the aforementioned portions of the support are shifted. This universally resilient mounting of the lamps is particularly useful in absorbing a great portion of the force of road shocks which would possibly injure the lamps if the latter were solidly secured to the vehicle.

The high tension current for exciting the tubes may be obtained from the ignition circuit of the motor of the vehicle or from a separate source as shown in Figure 5. In this instance a step-up transformer 37 is provided for each set of tubes and the primary windings 38 of the transformers are connected through a single pole double-throw switch 39 with the battery 41 and a current actuated interrupter 42. The current from the battery 41, when the switch 39 is in either of its extreme positions, will excite the interrupter 42 and cause a pulsating current to flow in the transformer primary winding thereby inducing in the secondary winding a potential sufficiently great to cause a discharge within the tube, the current after passing between the tube electrodes then passing to ground through the tube support and the strap 22 which is carried by the grounded frame of the vehicle.

The signal devices may be so wired that when it is desired to make a right hand turn, closing of the correct pair of contacts of the switch 39 will cause the red lights to be displayed on the right side of the car and the green lights on the left side of the car. Similarly when desiring to make a left hand turn the driver may display red lights on the left side of the car and green lights on the right side indicating to the drivers of approaching or following vehicles that it is safe to pass on that side of the car displaying the green light.

In the signalling device of my invention just described, the important features, other than the use of electric discharge tubes as the source of light, which because of their intensity and ability to penetrate fog are capable of a greater range of visibility than ordinary lamps, are the resilient mounting of the tubes by the curved portions 29 of the lamp support, thereby protecting the fragile tubes against shocks, the novel manner of mounting the supports in the apertures 26 formed in the lamp casing, and the use of the lamp supports as a current carrying portion of the electric circuit thereby dispensing with at least one conductor to convey the current out of the casing through the lower aperture thereof.

I claim:

1. A vehicle signal device comprising a casing, having a pair of joined sections, each of said sections having opposed notches therein registrable when said sections are joined to provide a pair of opposed apertures, a light source in said casing and means engaging said light source and in said apertures for resiliently supporting said light source for movement in any direction in said casing.

2. A vehicle signal device comprising a casing, having a pair of joined sections, each of said sections having opposed notches therein registrable when said sections are joined to provide a pair of opposed apertures, a plurality of tubular lamps in said casing and means for supporting said lamps for movement in any direction in said casing comprising a plurality of members each having depressions therein in which said lamps may seat and portions entering the apertures of said casing.

3. A vehicle signal device comprising a hollow casing having a pair of sections provided with abutting rims, said sections each having notches in opposed portions of the rims thereof registrable, when the latter are in abutting relationship, to provide in the casing a pair of opposed apertures, a lamp within said casing, and a bracket for supporting said lamp for movement in any direction within the casing having portions disposed in said casing apertures, a portion engaging said lamp, and universally resilient portions joining said lamp engaging portion and the portions disposed in said apertures.

4. A vehicle signal device comprising a hollow casing having a pair of sections provided with abutting rims and a peripheral groove, said sections each having notches in opposed portions of the rims thereof registrable, when the latter are in abutting relationship, to provide in the casing a pair of opposed apertures, a lamp within said casing, a bracket for supporting said lamp for movement in any direction within the casing having portions disposed in said casing apertures, a portion engaging said lamp, and universally resilient portions joining said lamp engaging portion and the portions disposed in said apertures, a base, and a strip of material disposed in said peripheral groove of the casing, secured to said base, and contacting the portions of said lamp supporting bracket disposed in said casing apertures.

HI KOREMATSU.